Figure 1:
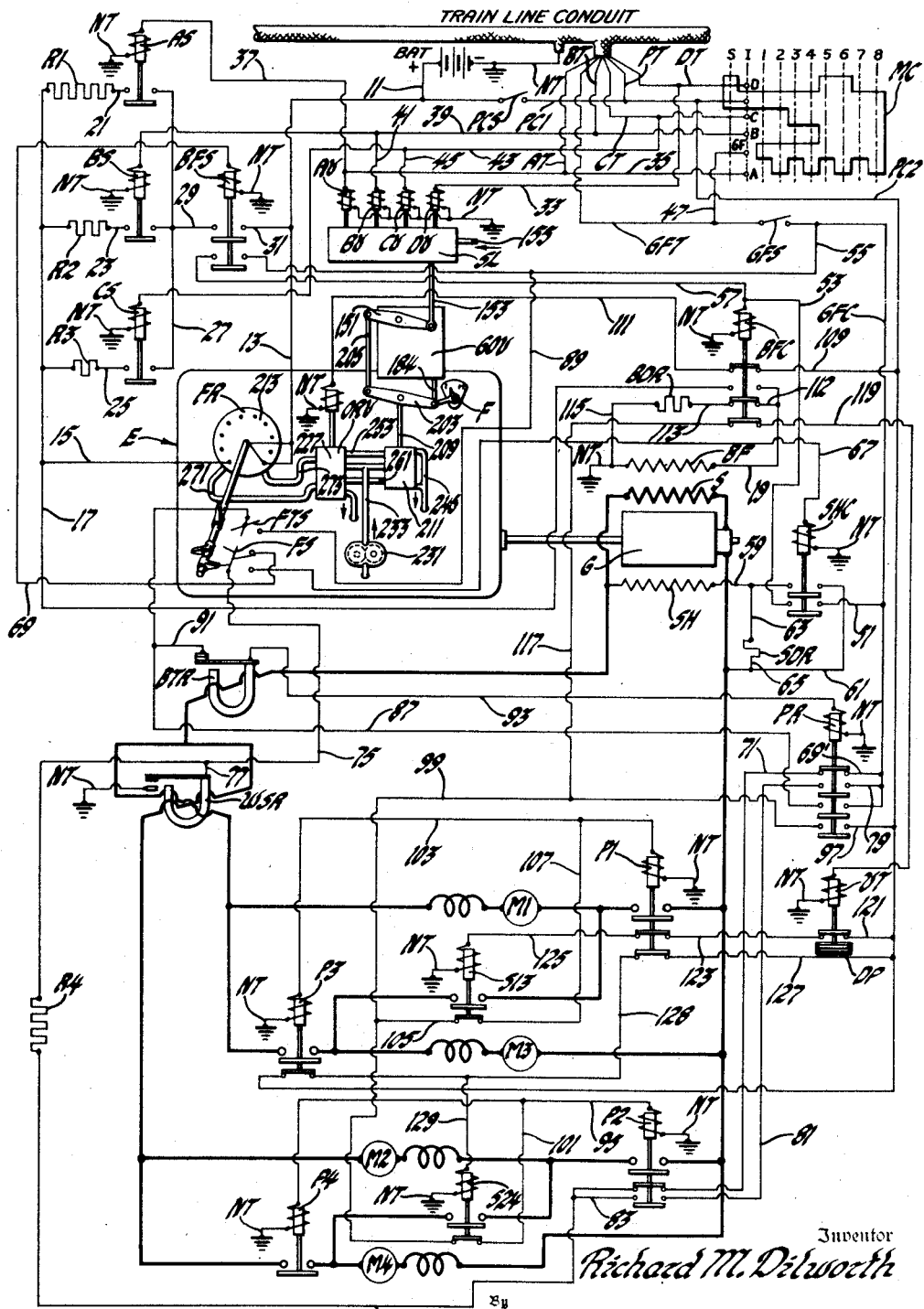

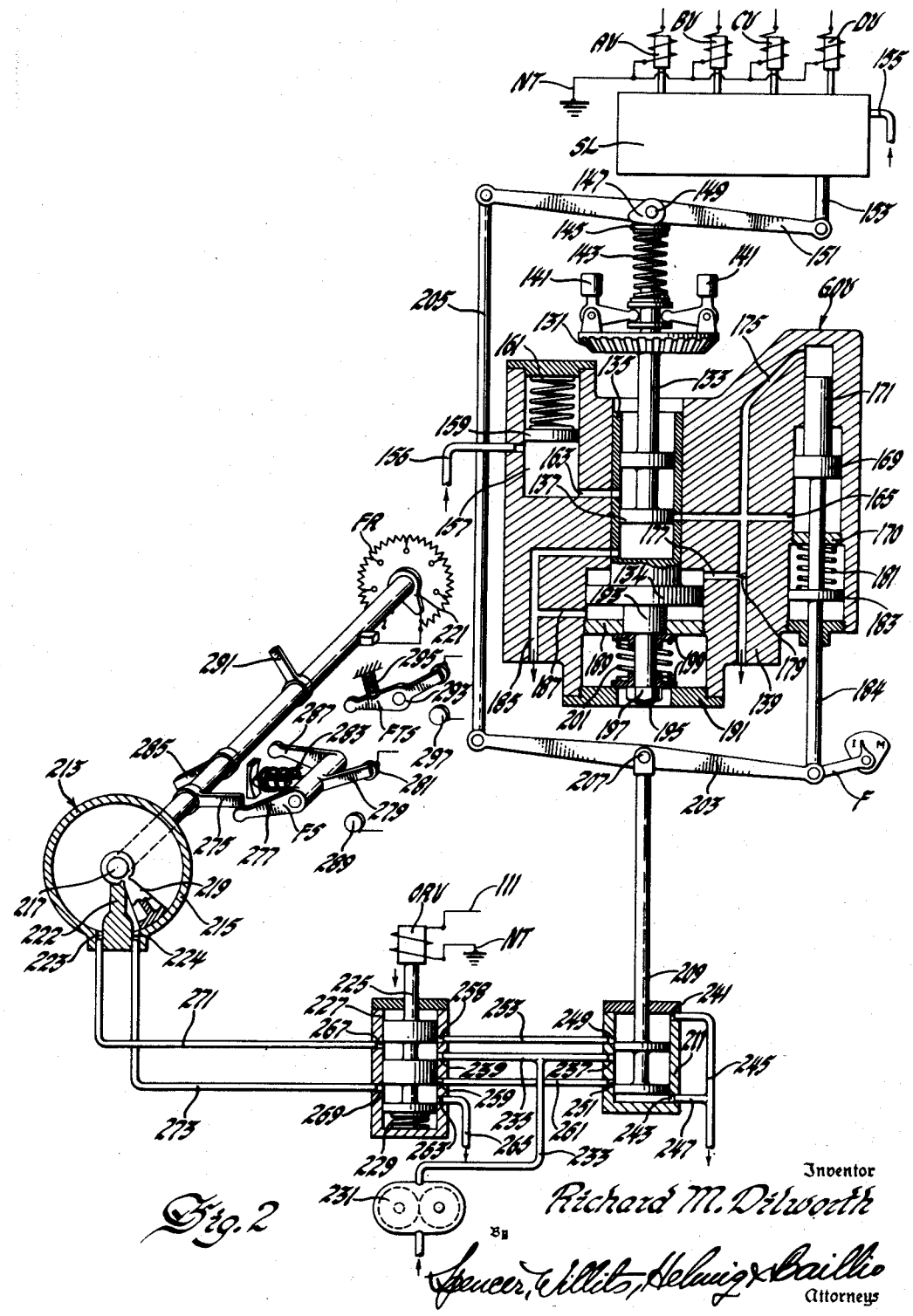

Patented Sept. 26, 1950

2,523,753

UNITED STATES PATENT OFFICE 2,523,753

GENERATING ELECTRIC TRACTION AND CONTROL SYSTEM

Richard M. Dilworth, Hinsdale, Ill., assignor to General Motors Corporation, Detroit, Mich., a corporation of Delaware Application August 17, 1949, Serial No. 110,829

10 Claims. (Cl. 290—17)

1

This invention generally relates to generating electric drive and control systems and more particularly to a drive and control system for a generating electric locomotive.

The maximum starting tractive effort exerted by (main line) Diesel electric locomotives is sufficient to cause parting of a long train of coupled cars in case the brakes on the cars are not released and accordingly it is conventional practice to limit the increase in power output of the Diesel engine and electric traction generator power plant supplying the electric traction motors to limit the increase in motor starting torque in order to provide smooth and gradual starting of long trains should the master controller operated by the locomotive engineer be moved too rapidly from the idle toward the maximum power output position. This conventional practice has been found particularly effective in preventing damage to the locomotive and train and provides exceptionally smooth starts especially during change-over from steam to Diesel electric locomotives when the steam engineers are inexperienced in the operation of these Diesel electric locomotives.

In that Diesel electric locomotives are now in wide use for all classes of railway service the acquired skill of the engineers can be taken better advantage of by providing a traction and control system in which there is minimum lag between manual controller movement and locomotive movement.

The principal object of this invention is accordingly to provide a generating electric locomotive traction and control system having greater flexibility and a prompt response to manual controller movement thereby providing prompt and increased starting tractive effort and acceleration to take care of the wide and sudden demands of starting tractive effort imposed on locomotives used in general purpose railway service, which demands can only be anticipated and supplied by prompt and skillful operation of the automatic and manual control means provided in this system.

The combined manual and automatic control means for accomplishing this object and other novel features of this drive and control system will become apparent by reference to the following detailed description and drawings illustrating one form of the invention which is particularly adaptable to a general purpose Diesel electric locomotive, that is, one suitable for all classes of railway operation.

Figure 1 of the drawings is a schematic view of the complete drive and control system.

2

Figure 2 is an enlarged schematic view of certain of the controls shown in Figure 1 with parts shown broken away and in section to clearly show details thereof.

As best illustrated in Figure 1 the Diesel electric drive generally comprises a Diesel engine prime mover E shown directly connected to the armature of an electric traction generator G which is electrically connected by power circuit conductors, shown in heavy lines, to series type electric traction motors M1—M2—M3—M4, each operatively connected in conventional manner to a separate locomotive driving axle having traction wheels thereon, not shown. The generator G is provided with a separately excited battery field winding BF, a series field winding S and a shunt field winding SH.

It will be noted that series contactors S13—S24 and parallel contactors P1—P2—P3—P4 are shown connected with the power conductors for causing transition of the traction motor circuit connections between series-parallel and parallel circuit relation with the generator G in response to operation of a forward transition switch FTS and a backward transition relay BTR. These series and parallel contactors may be either the electromagnetic or electropneumatic type and each is provided with an electromagnetic winding, upper power and lower interlocking contacts. The backward transition relay BTR and a wheel slip relay WSR are also included in the motor power connections. Each of these relays is shown provided with a U-shaped magnetic yoke and an armature movable thereby. It will be noted that the contacts of the backward transition relay are shown normally closed and a power conductor from one side of the generator G passes through the yoke and upon a given value of current flow therein the yoke will be magnetized and the armature will be attracted to cause opening of the relay contacts. The power conductor passing through the backward transition relay yoke is shown connected to a loop power conductor, the two legs of which are shown passing in opposite directions through the yoke of the wheel slip relay WSR, one leg being shown connected to the traction motors M1—M3 and the other leg being shown connected to the motors M2—M4. It will be evident that with this arrangement of power connections that as long as all the motors operate at equal speeds equal values of current will flow in opopsite directions through each of the legs of the loop conductor to prevent magnetization thereof and the relay contacts will remain normally open, as shown. Should one of the motors, however, increase in speed, due to slippage of the traction wheels driven thereby, a difference in current will occur in the two legs of the loop conductor causing magnetization of the yoke of the wheel slip relay and the armature will be attracted thereby and cause closure of the relay contacts.

The contacts of the backward transition and wheel slip relays and a forward transition switch FTS are included in a control and interlocking circuit, shown in light lines in Figure 1, along with the interlocking contacts of the series and parallel contactors, generator shunt and battery field contactors SHC—BFC, a parallel relay PR, a time delay relay VT and an electrohydraulic overriding valve ORV.

An engine driven governor of the conventional isochronous type, indicated generally by the character reference GOV in Figure 1, controls movement of the engine fuel regulator lever F and a generator battery field rheostat FR, the operating shaft of which is provided with operating means for the forward transition switch FTS and generator field switching means FS to be described. A manually operable master controller MC controls energization of electropneumatic governor speed and load setting means SL having electromagnetic control valves AV, BV, CD and DV. The master controller also controls electromagnetically controlled generator battery field switches AS, BS and CS and an electromagnetic field switch BFS controlled by a field switch FS for modifying the excitation and output of the generator upon starting of the locomotive.

The master controller MC is shown provided with a plurality of stationary contacts and a manually movable drum contact cooperating therewith. The drum contact is movable between engine stop and idle controlling positions S—I and eight operating controlling positions, shown numbered 1 to 8, position 8 being the maximum speed and output controlling position of the locomotive engine and generator power plant.

A battery BAT is provided for energization of the generator battery field winding BF and the above mentioned electromagnetic control means. The negative battery terminal is connected to a negative train line control conductor NT, shown extending into a train line conduit. The negative control conductor is also connected to the negative or return terminals of the generator battery field winding BF and each of the above mentioned electromagnetic control means and, in order to clearly indicate these connections and at the same time greatly simplify the drawing, the negative train line conductor and each of these negative terminals are shown grounded and indicated by the character reference NT for this reason only as it is preferred to use an ungrounded control circuit.

The positive battery terminal is connected by conductors 11 and 13 to one stationary terminal and the movable contact of the field rheostat FR and also to one terminal of a positive control switch PCS which is manually closed to energize the positive control conductor PC1 shown connected between the other terminal of the positive control switch PCS and the stationary contact second from the top of the master controller MC. A positive train line control conductor PT is connected to the control conductor PC1 and is shown extending into the train line conduit. A branch positive control conductor PC2 is also connected to the conductor PC1. The other terminal of the field rheostat FR is connected in series with the normally open contacts, second from the top of the battery field contactor BFC to the positive terminal of the generator battery field winding BF by conductors 15—17—19—NT. The normally open contacts of each of the electromagnetic field switches AS—BS—CS are connected in series with separate battery field modifying resistors R1—R2—R3 by conductors 21—23—25. The series connected switch BS and resistor R2 are connected in shunt relation between conductors 17 and 27 by a conductor 29 and the series connected switch AS and resistor R1 and also the series connected switch CS and resistor R3 are also connected in shunt relation between the conductors 17—27. The electromagnetic battery field switch BFS having normally open upper and lower contacts is provided to connect the field switches AS—BS—CS and the resistors R1—R2—R3 in shunt relation with the terminals of the field rheostat FR, the upper contacts of the switch BFS being connected in series between conductors 13—29 by conductor 31.

The upper stationary contact of the master controller MC is connected to a train line conductor DT shown entering the train line conduit and a branch conductor 33 leads therefrom to the positive terminal of the electropneumatic valve DV of the governor speed and load setting means SL, the negative terminal of which is connected to the negative train line conductor NT. The lower stationary contact of the master controller MC is connected to the positive terminals of the electromagnetic windings of the governor speed setting means AV and the electromagnetic battery field switch AS by conductors 35—37—NT and a train line conductor AT is shown leading from these conductors and entering the train line conduit. The third stationary contact from the bottom of the master controller is connected by conductors 39—41 to the positive terminals of the windings of the electropneumatic valve BV and electromagnetic battery field switch BS and a train line conductor BT is shown connected to the conductors 39—41 and entering the train line conduit. The stationary contact third from the top of the master controller MC is connected to a train line control conductor CT shown entering the train line conduit and conductors 43—45 lead therefrom and are connected to the positive terminals of the electropneumatic valve CV and electromagnetic battery field switch CS. The stationary contact second from the bottom of the master controller MC is connected by a conductor 47 to a generator field train line control conductor GFT shown entering the train line conduit and connected to one terminal of a manually operated generator field switch GFS. The opposite terminal of the switch GFS is connected to a positive generator battery field control conductor GFC.

The conductor GFC serves to energize the following control apparatus and the generator battery field winding BF through the following interlocking and control connections.

The normally open lower contacts of the generator shunt field contactor SHC are connected in series relation between the conductor GFC and positive winding terminal of the battery field contactor BFC by conductors 51—53.

The generator shunt field winding SH and the normally open upper contacts of the contactor SHC are connected in series and across the generator armature terminals of the generator G by conductors 59—61 and a shunt field discharge resistor SDR is connected by conductors 63—65 between conductors 59—61. The positive terminal of the winding of the shunt field contactor SHC is connected by a conductor 67 to the lower stationary contact of the field switch FS and the upper stationary switch contact is connected by a conductor 69 to the positive terminal of the electromagnetic battery field switch BFS. The normally closed upper contacts of the parallel relay PR, the normally closed upper interlocking contacts of the parallel contactor P2 and a resistor R4 are connected in series by conductors 69'—71—73—75 between the conductor GFC and the movable contact of the field switch FS and a conductor 77 is connected between conductor 75 and the positive armature contact of the wheel slip relay WSR, the stationary contact of which is shown connected to the negative train line conductor NT. The normally open contacts second from the top of the parallel relay PR and the normally open lower interlocking contacts of the parallel contactor P2 are connected in series by conductors 79—81—83 between conductors GFC and 73. The normally open contacts second from the bottom of the parallel relay PR are connected in series by a conductor 87 between conductor GFC and the movable contact of the forward transition switch FTS, the stationary contact of which is connected by a conductor 89 to the conductor 55. The normally closed contacts of the backward transition relay BTR are shown connected by conductors 91—93 in series relation between the conductor 87 and positive terminal of the parallel relay PR.

The positive control conductor PC2 serves to energize the series and parallel contactors, the electrohydraulic overriding valve ORV and the time delay relay VT through the following interlocking and control conductors. The lower normally open contacts of the parallel relay PR and the normally closed interlocking contacts of the series contactor S24 are connected in series between the positive control conductor PC2 and a conductor 95 interconnecting the positive winding terminals of the parallel contactors P2—P4 by conductors 97—99—101. The normally closed interlocking contacts of the series contactor S13 are connected in series between the conductor 99 and a conductor 103 interconnecting the positive winding terminals of the parallel contactors P1—P3 by conductors 105 and 107.

The upper normally closed contacts of the battery field contactor BFC are connected in series between the positive control conductor PC2 and the positive winding terminal of the electrohydraulic overriding valve ORV by conductors 109—111. The normally open contacts of the contactor BFC second from the top are connected in series between the conductor 17 and the positive terminal of the generator battery field winding BF by a conductor 19 and the normally closed contacts second from the bottom are connected in series with a battery field discharge resistor BDR and in shunt relation with the opposite terminals of the battery field winding BF by conductors 112—113—115. The lower normally closed contacts of the contactor BFC are connected in series between the conductor 99 and the positive winding terminal of the time delay relay VT by conductors 117—119. The normally closed contacts of the time delay relay VT and the upper normally closed interlocking contacts of the parallel contactor P1 are connected in series relation between the positive control conductor PC2 and the positive winding terminal of the series contactor S13 by conductors 121—123—125. Each of the normally closed lower interlocking contacts of the parallel contactors P1 and P3 are connected in series between the positive control conductor PC2 and the positive winding terminal of the series contactor S24 by conductors 127—128—129.

As best illustrated in Figure 2 the governor GOV and its speed and load setting means SL serve as the automatic speed, load and output regulating means for the engine and generator power plant. The governor is of a well known isochronous type and includes an engine driven weight carrying member 131. A governor pilot valve 133 is shown provided with axially spaced lands extending into a pivoted compensating sleeve 135 provided with an enlarged diameter compensating receiving piston 134 reciprocal in aligned bores in the governor housing 139. Governor fly weights 141 of bell crank form are pivoted on the weight carrying member 131 and one end of a speeder spring 143 bears on the grooved end of the pilot valve and one end of each of the weights 141 engages the pilot valve groove. The spring 143 opposes outward angular centrifugal movement of the weights. A cam follower block 145 engaged by the other end of the speeder spring 143 is held in engagement by this spring with a cam 147 secured on a pivot support pin 149 attached to the speed and load setting lever 151 for the governor intermediate the ends of this lever. One end of the lever 151 is pivotally connected to the operating link 153 of the electropneumatic speed and load setting means SL for the governor. This electropneumatic setting means is of a well known type having a movable operating link 153 which is operatively connected by levers and spring biased pneumatic plungers, not shown, each plunger being controlled by one of the electropneumatic valves AV—BV—CV—DV of the speed and load setting means SL, shown provided with an air pressure supply pipe 155. With the master controller MC in the engine idle control position I, as shown in Figure 1, all of the electropneumatic valves are deenergized and closed and the speeder spring 143 is tensioned to cause idle operation speed of the engine. The valve DV is energized and opens upon movement of the master controller MC to the stop position S to cause downward movement of the operating link 153 to reduce the speeder spring tension and shut the engine down. Energization of the four speed and load setting valves AV—BV—CV—DV separately and in various combinations by movement of the master controller between operating positions 2—8 causes seven upward steps of movement of the link 153 and a corresponding increase in tension of the governor speeder spring 143 by the lever 151 and cam 147 to increase the speed and load setting of the governor to control the speed and load of the engine and generator power plant. Oil under pressure is supplied by a governor pump, not shown, through a pipe 156 to a port in the bore of an accumulator chamber 157 in the governor housing having a piston 159 therein cooperating with this port and loaded by a spring 161 to maintain the oil in this chamber at substantially constant pressure. A passage 163 leads from this chamber and forms a port in the bore in which the compensating sleeve 135 slides. With the engine running at idling speed the upper port in the compensating sleeve 135 registers with this port and passage 163 and oil pressure enters the space in the sleeve between the upper and lower lands of the pilot valve 133 and the lower land blocks the lower sleeve port which registers with a port formed by passage 165 leading to the space in another bore of the housing below a power piston 169 slidable therein and above a lower cylinder head 170. The power piston 169 is provided with a reduced diameter upper piston portion serving as a compensator actuating piston 171 slidable in an aligned housing bore from which a drain passage 175 leads to the exterior of the governor housing. A branch passage 177 leads from the passage 175 to the space in the bore above the compensating receiving piston 137. A needle valve 179 is provided at the junction of the passages 175—177. A spring 181 is placed between the cylinder head 170 and a land 183 formed on the lower rod end portion 184 of the power piston and shown extending through the opening in the cylinder head 170 and pivotally connected to the engine fuel regulator lever F. The spring 181 tends to urge the power piston 169 downwardly against the action of the oil trapped below the power piston 169 and thereby tends to rotate the engine fuel regulator F from the idle position I, shown, to the engine stop position S. Other drain passages 185—187 in the governor housing lead to the exterior of the housing from the space in the sleeve 135 below the lower land of the pilot valve and from the space below the compensating receiving piston 137. Upper and lower abutments 189—191 are secured in the lower extremity of the bore in which the compensating piston slides. The upper abutment has an opening through which a reduced diameter portion 193 of the compensator piston extends and a smaller diameter lower rod end portion 195 extends downwardly therefrom having a nut 197 threaded on the lower end and movable in an opening in the lower abutment. Collars 199 with with a compensating compression spring 201 therebetween are positioned on the rod end, the spring tending to urge the collars apart and to maintain the upper collar 199 into contact with the end of the piston portion 193 and upper abutment 189 and to maintain the lower collar 199 in contact with the lower abutment 191 and nut 197 to return and retain the compensating receiving piston 137 and sleeve 135 in the centered position shown and to resiliently oppose upward and downward movement from this position upon a change in engine speed from the value set.

A floating lever 203 is pivotally connected at one end to the power piston rod end 184 and the engine fuel lever F and the opposite end of the floating lever is connected by a link 205 to the opposite end of the speed and load setting lever 151. In that the amount of fuel supplied a Diesel engine is proportional to the engine torque the end of the floating lever 203 connected to the engine fuel lever F moves in proportion to the torque output of the engine and as the other end of the floating lever is connected by the link 205 to the speed and load setting lever this end of the floating lever moves in proportion to the engine speed and therefore a pivot point 207 intermediate the end of the lever will be moved to a position proportional to the power output of the engine corresponding to the fuel supplied to the engine and the engine, load and output speed setting in a well known manner. A pilot valve 209 having two lands slidable in a pivoted cylindrical valve housing 211 is pivotally connected to the pivot point 207 of the floating lever 203 for controlling a hydraulic vane motor, shown generally at 213 for operating the generator field rheostat FR in order to maintain constant speed, load and output of the engine and generator power plant in conventional manner corresponding to the speed and load and output setting of the governor.

The vane motor comprises a housing 215 having a rotatable shaft 217 therein on which a motor vane 219 and the movable contact arm 221 of the field rheostat FR are secured. The movable contact arm 221 engages the stationary contacts and terminals shown on the rheostat between which resistance elements are shown electrically connected. The vane 219 slidably engages the end walls and internal periphery of the motor housing 215 and is movable angularly therein between opposite sides of a housing abutment 222, the inner end of which is in fluid sealing engagement with the hub of the vane 219. Ports 223—224 are provided in the vane motor housing 215 on opposite sides of the abutment 222 to control reverse movement of the vane 219 and movable contact 221 of the field rheostat FR by the vane motor in response to movement of the pilot valve 209 and also in response to movement of the valve stem 225 of the electrohydraulic overriding valve ORV previously referred to. The overriding valve stem 225 is shown provided with three lands which are movable downwardly in a cylindrical ported valve housing 227, to the position shown in Figure 2, against the action of a spring 229 upon energization of the electromagnetic winding of the overriding valve ORV. A pump 231 supplies oil pressure through supply pipes 233—235 to separate pressure support ports 237—239 in the vane motor pilot valve and overriding valve housings 211—227. The pilot valve housing 211 is shown provided with opposite end drain ports 241—243 and drain pipes 245—247, leading therefrom and control ports 249—251 above and below the pressure supply port 233. The control port 249 is connected by a pipe 253 to a port 258 in the overriding valve housing 227 and another port 259 therein is connected by a pipe 261 to the other control port 251 in the pilot valve housing 211. A drain port 263 and pipe 265 connected thereto is shown in the overriding valve housing 227 and a pair of ports 267—269 are also provided therein, the port 267 being connected to the port 223 in the vane motor housing 215 by a pipe 271 and the other port 224 in this housing is connected by a pipe 273 to the port 269 in the overriding valve housing.

With the governor set at idling speed and the engine idling the vane motor pilot valve stem 219 and the overriding valve stem 225 will occupy the position shown and oil under pressure will be supplied by the pump 231 through pipes 233—235 and ports 239—267 in the overriding valve and through the pipe 271 and port 222 in the vane motor housing to rotate the vane 219, vane shaft 217 and movable contact arm 221 of the field rheostat FR to the maximum clockwise position, shown in Figure 2, which position is the maximum resistance position of the field rheostat FR corresponding to minimum battery field excitation position. The oil is discharged from the vane motor through the port 224, pipe 273 and ports 269—263 and drain pipe 265 of the overriding valve ORV. With the shaft 217 of the vane motor and rheostat contact arm 221 in this position a lug 275 on the shaft 217 engages and moves one arm 277 of the field switch FS and causes a switch contact arm 279 to move into contact with the upper stationary contact 281 thereof, as shown in Figures 1 and 2, to control energization of the electromagetic battery field switch BFS. An overcenter toggle mechanism including a spring and generally indicated at 283 tends to hold the contact arm 279 in this position until another lug 285 on the shaft 217 engages and moves another arm 287 of the switch FS upon counterclockwise movement of the shaft 217, vane 219 and rheostat contact arm 221 to a position midway between the minimum and maximum resistance position and causes movement of the switch contact arm 279 into contact with the lower stationary switch contact 289 to control energization of the shunt field contactor and also moves the toggle mechanism 283 overcenter to the other way to hold the contacts of the field contact arm 279 in this position until the switch arm 277 is again engaged and moved by the shaft lug 275 to again move the switch contact arm 279 back to the position shown. A third lug 291 on the shaft engages and moves the movable contact arm 293 of the forward transition switch FTS from the open position shown against the force of a spring 295 into closed contact position with the stationary switch contact 297 when the movable contact 221 of the field rheostat is moved counterclockwise to the minimum resistance position corresponding to the maximum battery field position in order to control forward transition of the traction motor power connections from series-parallel to parallel power circuit relation with the generator G.

The operation of the above described drive and control system is as follows: With the drum contact of the master controller MC in the idle position as shown in Figure 1 and the positive control switch PCS and generator field switch GFS manually closed and engine E operating at idle speed the windings of the series contactors S13—S24 and the overriding valve ORV are energized. The winding of the series contactor S13 is energized through the normally closed contacts of the time delay relay VT, the upper interlocking contacts of the parallel relay P1 and conductors 11—13—PC1—PC2—121—123—125 and the negative train line conductor NT and the winding of the series contactor S24 is energized through the normally closed lower contacts of the parallel relay P1 and conductors PC2—127—128—129—NT or through the lower closed interlocking contacts of the parallel relay P3 and conductors PC2—128—129—NT to cause the closure of the power contacts of the series contactors S13—S24 and the connection of the traction motors M1—M2—M3—M4 in series-parallel circuit relation with the generator G.

The winding of the overriding valve ORV is energized through the normally closed upper contacts of the battery field contactor BFC and conductors PC2—109—111 and the negative train line conductor NT to cause the movable contact 221 of the field rheostat to be moved to the maximum resistance or minimum battery field position by the vane motor 213 which also causes the movable contact 279 of the field switch FS to engage the upper stationary contact 281 thereof of this switch as previously described and illustrated in Figure 2.

The drum contact of the master controller MC is moved from the idle control position I as shown to the first starting control position 1 to cause "creeping" movement of the locomotive unit only, without coupled cars. With the controller drum contact in position 1 the stationary controller contacts second from the bottom and top are bridged by the controller drum contact and energization of the winding of the battery field switch BFS to cause closure of the upper and lower contacts of this switch. Energization of the winding of the switch BFS taking place through the above mentioned bridged controller contacts, the normally closed upper contacts of the parallel relay PR, the normally closed upper interlocking contacts of the parallel relay P2, the resistor R4, the above mentioned contacts of the field switch FS and conductors 11—13—PC1—47—GFT—GFC—69'—71—73—75—69 and NT. The closure of the lower contacts of the battery field switch BFS causes energization of the winding of the battery field contactor BFC through conductors GFC—55—57—NT and the opening of the upper and two lower contacts and the closure of the contacts second from the top thereof.

The closure of these contacts of the battery field contactor BFC causes energization of the battery field winding BF through the field rheostat FR, then in the maximum resistance or minimum battery field control position and conductors 11—13—15—17—19—NT. The opening of the upper contacts deenergizes the winding of the overriding valve ORV and upward movement of the valve stem 225 by the spring 229 occurs to open the ports 258—259 and to close the pressure supply port 239 and the drain port 263 to allow flow of oil pressure from the pump 231 through pipes 233—235, ports 237—251 in the pilot valve housing, pipe 261, ports 263—269 of the overriding valve and pipe 273 and port 224 of the vane motor to start counterclockwise movement thereof and the field rheostat contact arm 221 toward the minimum resistance position to increase the excitation current in the battery field winding BF and the generator output current to the motors to gradually increase the tractive effort of the locomotive. The oil is discharged from the vane motor through the port 223, pipe 271, ports 267—258 of the valve ORV, pipe 253, ports 249—241 in the pilot valve housing 211 and drain pipe 245.

The immediate tractive effort of the locomotive with the rheostat in the maximum resistance position is 2,000 pounds on a 120 ton locomotive and is sufficient to accelerate a light locomotive with the engine warmed up at about one-tenth of one mile an hour per second. This rate of acceleration will extend to a speed of two miles per hour and then decrease upon movement of the field rheostat FR by the vane motor toward the minimum resistance position upon deenergization of the overriding valve ORV and backward movement of the rheostat and adjustment of the engine fuel regulator by action of the governor. The balanced speed of the light locomotive unit on level tangent track will be about three miles per hour with the controller in control position 1.

Upon movement of the master controller drum to the second starting position 2 from the idle position the windings of speed and load setting valve AV and switch AS are also energized by the additional bridging of the bottom stationary controller contact by the controller drum contact as well as the controller contacts bridged in the first controller position. The windings of the valve AV and switch AS are energized through conductors PC1—35—37 and NT to cause slight upward movement of the speed and load setting link 153 and right end of the speed and load setting lever 151 to increase the tension of governor speeder spring 143. The left end of the speed and load setting lever 151 and the connecting link 205 with the left end of the floating lever 203 causes a decrease in resistance in the field rheostat FR by the vane motor and an increase in the power output of the generator. The increased load on the speeder spring 143 causes downward movement of the governor pilot valve 133 and oil pressure to pass from the accumulator chamber 157 through the intermediate and lower ports in the compensating sleeve 135 to the space below the power piston and move the piston upward to increase the fuel setting of the engine fuel regulator lever F and to move the right-hand end of the floating lever 203 upward to regulate the engine fuel speed and torque and the field rheostat to an increased generator output position to balance the available torque and power output of the engine and to then cause the engine and generator to operate at substantially constant speed, load and output in a well known manner. The compensating means, described, of the governor GOV is conventional to cause the return of the pilot valve 133 and compensating sleeve 135 to their original position when the power plant operates at the set speed and load leaving the engine fuel lever and field rheostat in the new controlling positions.

Energization of the winding of the switch AS causes closure of the contacts thereof and as the upper contacts of the battery field switch BFS are now closed, the field rheostat FR is shunted by the resistor R1 through the closed contacts of the switches AS and BFS and conductors 13—31—29—27—21 and 17 to cause a more rapid increase in the battery field excitation than can be accomplished by movement of the field rheostat in order to give a prompt increase in the power output of the engine and generator power plant to the motors in response to controller movement. The immediate tractive effort then exerted is 11,000 pounds and will hold constant to 1.5 miles per hour and fall off with an increase in speed. If the locomotive fails to start the tractive effort will increase to 26,000 pounds.

Movement of the drum of the master controller MC to the third position from the idle position causes the bridging of the stationary controller contacts second from the top, third from the top and second from the bottom. The bridging of the third contact from the top causes energization of the windings of speed and load valve CV and switch CS through conductors PCS—CT—43—45—NT to increase the speed and load setting of the governor GOV and closure of the contacts of the switch CS to shunt the resistor R3 across the field rheostat. This causes an immediate tractive effort of 25,000 pounds and if the locomotive starts to move this tractive effort will hold constant to 1.5 miles per hour and then fall off as the speed increases. If the locomotive fails to start the tractive effort will build up to a maximum of 51,000 pounds.

Movement of the drum of the master controller to the fourth position from the idle position causes the bridging of the stationary controller contacts second and third from the top and the two bottom contacts. This causes the energization of the windings of the speed and load setting valves AV—CV and the switches AS—CS through the connections described above to cause the resistors R1—R3 to be connected in parallel and in shunt relation with the field rheostat FR. This causes an increase in the speed, load and output setting of the governor and an immediate increase in tractive effort to 28,000 pounds, and if the locomotive starts, this tractive effort will hold constant up to 3 miles per hour, increasing with a heavy train and decreasing slightly with a very light train. If the locomotive fails to start, the tractive effort will increase to a value sufficient to cause slippage of the traction wheels.

Movement of the controller from the idle position to the fifth position causes energization of the windings of the speed and load setting valves BV—CV—DV and switches BS and CS, the windings of the valve DV taking place through the upper controller contact and conductors PCS—DT—33—NT to cause a further increase in the speed, load and output setting of the governor GOV and connection of the resistors R1—R2—R3 in parallel and in shunt relation with the field rheostat FR. This results in an immediate increase in tractive effort of 38,000 pounds and if the locomotive starts the tractive effort will remain steady at this value up to 5 miles per hour, increasing with a heavy train and decreasing slightly with a very light train. If the locomotive fails to start the tractive effort will increase to a value causing slippage of the traction wheels.

Movement of the master controller to the sixth position from the idle position causes energization of all of the speed and load setting valves AV—BV—CV—DV and all of the switches AS—BS—CS to further increase the governor speed and load setting and connect all of the resistors R1—R2—R3 in parallel and in shunt relation with the field rheostat FR. This causes an immediate tractive force of 42,000 pounds and if the locomotive starts this tractive effort will hold substantially constant up to 6 miles per hour, increasing with a heavy train. If the locomotive fails to start the tractive effort will rise quickly and cause immediate slippage of the traction wheels.

The seventh and eighth controller positions are running controlling positions and are rarely used for starting a train. It will be noted that in the seventh position the windings of the speed and load setting valves BV—CV and switches BS—CS are energized and in the eighth position the windings of the valves AV—BV—CV and the switches AS—BS—CS are energized to cause successively greater speed and load settings of the governor above that of the sixth controller position.

The values of the resistors R1—R2—R3 are so selected that with the generator shunt field winding open in starting and one or more resistors shunted across the battery field rheostat in the above mentioned relation the generator will not overload the engine upon starting of the locomotive and train, nor will any operating condition prevent the vane motor moving the field rheostat to the mid-position. This allows the engine to accelerate smoothly to the speed setting of the governor, and the vane motor and rheostat to start toward the mid-position as soon as the acceleration to this setting is completed. For each starting position of the controller the battery field excitation and generator load is under control of the master controller. By disconnecting the generator shunt field winding SH for starting a more rapid build-up of the battery field winding BF is obtained.

When the locomotive and train accelerates to a speed sufficient to cause movement of the field rheostat FR to the mid-position the movable contact 279 of the filed switch FS is moved by the lug 285 from the upper contact 281 as shown in Figure 1 into contact with the lower contact to excite the shunt field winding SH in combination with the battery field and cut out the shunting resistors. This occurs in a manner to be described in about 15 seconds after start in each controller starting position, the speed and load regulation is then under control of the governor GOV in conventional manner.

When the rheostat contact 221 is moved to the minimum resistance or maximum battery field position the forward transition switch FTS is closed to cause transition of the traction motors from the series-parallel to the parallel power circuit relation with respect to the generator. These changes occur at the following locomotive speeds and controller positions:

| Master Controller Position | Foward Transition |
|---|---|
|  | M. P. H. |
| 2 | 38 |
| 3 | 24 |
| 4 | 20 |
| 5 | 18—19 |
| 6 | 18—20 |
| 7 | 18—20 |
| 8 | 18—20 |

Upon movement of the contact 279 of the field switch FS from the top contact 281 to the bottom contact 279 the winding of the battery field switch BFS is deenergized and both contacts open to open the shunt connections of all the resistors R1—R2—R3 with respect to the field rheostat FR and the winding of the battery field contactor BFC is deenergized momentarily and its contacts fall momentarily to the position shown. Momentary opening of the contacts second from the top of the contactor BFC causes momentary deenergization of the generator battery field winding BF and discharge of this winding through the battery field discharge resistor BDR which is then connected in shunt relation with the battery field winding BF through the normally closed contacts second from the bottom of the battery field contactor BFC and conductors 112—113—115—NT—19. Momentary opening of the upper contacts of the contactor BFC causes momentary energization of the winding of the overriding valve ORV to start movement of the vane motor 213 and field rheostat FR toward the maximum resistance position in the manner previously described. Immediately thereafter the winding of the shunt field contactor SHC is energized through conductors 75—67—NT by the movable contact engaging the lower contact of the field switch FS which is held in this position by the toggle mechanism 283. This causes closure of both contacts of the shunt field contactor SHC to reenergize the winding of the battery field contactor BFC through the lower closed contacts and conductors GFC—51—53—NT to cause reexcitation of the battery field winding BF and deenergization of the winding of the overriding valve ORV to cause movement of the rheostat contact back to its original position. The closure of the upper contacts of the shunt field contactor SHC shunts out the discharge resistor SDR and connects the shunt field winding SH across the generator armature terminals through conductors 59—61, the discharge resistor being connected across these conductors by conductors 63—65. The above method of change-over from separate excitation to compound excitation of the generator prevents a power surge on the motors and a resulting torque surge therefrom and thereby insures a smooth change-over to compound excitation of the generator G.

Upon an increase in the locomotive speed corresponding to the controller positions given in the above table the movable contact of the field rheostat FR has been moved counterclockwise by the vane motor 213 to the minimum resistance or maximum battery field position to raise the voltage of the generator to a value greater than the back voltage of the traction motors. This causes the lug 291 on the vane motor shaft 217 to close the forward transition switch FTS causing energization of the winding of the parallel relay PR through these contacts, the contacts of the backward transition switch BTR and conductors GFT—55—89—87—91—93—NT thereby causing closure of the three lower and the opening of the upper contacts of the parallel relay PR.

The opening of the upper contacts of the parallel relay PR deenergizes the winding of the shunt field contactor SHC and the movable contact falls to the normal position shown, to insert the discharge resistor SDR in series with the shunt field winding SH and to deenergize the winding of the battery field contactor BFC and the movable contact thereof falls to the normal position to deenergize the winding of the overriding valve ORV, causing movement of the rheostat FR to the minimum battery field position, and to also cause deenergization and discharge of the battery field winding BF through the discharge resistor BDR. Closure of the second contacts from the top of the parallel relay PR sets up a reenergizing circuit to the winding of the shunt field contactor SHC. Closure of the third contacts from the top of the parallel relay PR establishes a holding circuit for the winding thereof comprising conductors GFT—87—91—93—NT. Closure of the bottom contacts of the relay PR energizes the winding of the time delay relay VT through the lower closed contacts of the battery field contactor and conductors PC2—97—99—117—119—NT, to cause delayed opening of the contacts of the time delay relay VT, the movable contact of which is shown provided with a dashpot DP for this purpose. The contacts of the time delay relay are delayed in opening until the generator shunt and battery fields SH—BF are discharged and the battery field rheostat has moved toward the maximum resistance position to cut off the generator power output to the motors. Upon this delayed opening of these contacts the winding of the series contactor S13 is deenergized and the movable contact thereof falls to the position shown to open the power circuit between the series connected motors M1—M3 and to cause closure of the interlocking contacts of the contactor S13. The windings of the parallel contactors P1—P3 are then energized through the closed lower contacts of the parallel relay PR, the closed interlocking contacts of the series contactor S13 and conductors PC2—97—99—105—107—103—NT to connect the motors M1—M3 in parallel with the generator and to cause the opening of the interlocking contacts of the parallel contactors P1—P2. Opening of the lower interlocking contacts of either or both of the parallel contactors P1—P2 causes deenergization of the series contactor S24 and its movable contact falls to the position shown to open the power circuit between the series connected motors M2—M4 and upon closure of the interlocking contacts of the series contactor S24 the windings of the parallel contactors P2—P4 are energized to connect the motors M2—M4 in parallel with the generator and cause the opening of the upper and the closure of the lower interlocking contacts of the parallel relay P2 which causes completion of the above mentioned reenergization circuit for the winding of the shunt contactor SH set up through the closed contacts second from the top of the parallel relay PR and these lower interlocking contacts of the contactor P2 and conductors GFC—79—81—83—73, the resistor R4, the movable and lower contact of the field switch FS and conductors 67—NT. This causes closure of the contacts of the shunt field contactor and reenergization of the generator shunt field winding SH through the closed upper contacts thereof and reenergization of the winding of the battery field winding BFC and reclosure of the second contacts from the top to cause reenergization of the battery field winding and the reopening of the upper and two lower contacts of the contactor BF. The opening of the upper contacts again causes deenergization of the overriding valve ORV and movement of the field rheostat FR from the maximum resistance position to its original position prior to transition between series-parallel and parallel and an increase in the generator power output to the now parallel connected motors.

The discharge of the generator shunt and battery field windings SH—BF and movement of the field rheostat to the maximum resistance or minimum battery field position occurs prior to transition of the motors M1—M3 from the series-parallel connection to a parallel connection with respect to the generator by the opening of the series connection prior to the establishment of the parallel connection followed by a similar transition of the connections of the motors M2—M4 and the reexcitation of the generator shunt and battery field windings. The field excitation of the battery winding being gradually increased to its original value causes a gradual restoration of generator output to the parallel connected motors and thereby gradually increases the tractive effort and accordingly provides an exceptionally smooth closed circuit forward transition of the motor connections from series-parallel to parallel.

Backward transition of the motor connections from parallel to series-parallel is controlled by the backward transition relay BTR which acts automatically in response to the current in the parallel motor circuit at a value below that causing overloading of the engine and generator power plant or upon movement of the master controller back to the idle position. The backward transition relay is calibrated to automatically cause backward transition upon opening of its contacts at the current value mentioned above and with the excitation control provided to cause the above described forward transition, backward transition can only occur in controller positions 4, 5, 6, 7 and 8 upon opening of the contacts of the backward transition relay BTR at the above described current value.

When these contacts open the winding of the parallel relay is deenergized and the movable contact falls to the position shown. The circuit through the contacts of the parallel relay PR second from the top, the lower interlocking contacts of the parallel relay P2, resistor R4 and the movable and lower contact of the field switch FS and winding of the shunt field contactor SHC including conductors GFC—79—81—83—73—75—67 and NT will be opened and the contacts of the shunt contactor SHC will open and the movable contact will fall to the position shown to again deenergize the winding of the battery field contactor BFC and its movable contact will also fall to the position shown to cause discharge of the generator shunt and battery field windings SH—BF. With the battery field contact in the normal position the winding of the overriding valve will again be energized to cause movement of the field rheostat to the maximum resistance position. The opening of the contacts second from the bottom of the parallel relay PR causes deenergization of the holding circuit to the winding of the parallel relay PR. The opening of the lower contact of the parallel relay deenergizes the windings of the time delay relay VT and parallel contactors and the movable contacts thereof will fall to the normal positions shown and the windings of the series contactors S13—S24 will again be energized through the interlocking contacts of the parallel contactors to connect the motors in series-parallel relation with the generator and the winding of the shunt field contactor will again be energized through the upper contacts of the parallel relay PR and upper interlocking contacts of the parallel contactor P2 to reexcite the generator shunt field windings. Energization of the winding of the battery field contactor BF occurs upon energization of the winding and closure of the lower contacts of the shunt field contactor SHC and this causes energization of the battery field winding BF and deenergization of the winding of the overriding valve ORV to cause gradual increase in the battery field winding to original value.

It will be evident that should the contacts of the wheel slip relay WSR close due to wheel slippage when the motors are in either the series-parallel or parallel circuit relation the circuit to either the winding of the battery field contactor BFC or the shunt and battery field contactors is shunted to cause discharge of one or both of the generator field windings BF—SH and energization of the winding of the overriding valve to cause movement of the field rheostat to the maximum resistance position to check wheel slippage. This causes reopening of the contacts of the wheel slip relay and a gradual increase in the battery field excitation to the original value and an increase in the shunt field excitation to its original value to prevent the reoccurrence of wheel slip.

I claim:

1. A generating electric power plant and control system comprising an engine having fuel varying means, an electric generator driven thereby and provided with an excitation system including a rheostat having an element movable between high and low excitation and output controlling positions, means acting in response to the engine speed for controlling the engine fuel varying means, manually operable speed response varying means for the speed responsive means, rheostat control means operable by the combined action of the fuel varying means and manually operable speed response setting means to cause operation of the engine and generator at constant available speed, load and output values between low and high values, and excitation resistors and resistor switching for connecting the resistors across the rheostat in response to operation of the manually operable speed response setting means when the rheostat element moves from the low toward the high position to provide a prompter increase in the speed, load and output of the engine and generator.

2. A generating electric power plant and control system comprising an engine having fuel varying means to vary the speed, torque and output of the engine, an electric generator driven by the engine and having excitation varying means including a rheostat having an arm movable between minimum and maximum excitation and output controlling positions, excitation resistors and sequentially operable resistor switches in series with the resistors and a two way switch operable one way to connect the resistors and resistor switches across the rheostat by movement of the rheostat arm to the minimum position to provide a rapid increase in excitation and output of the engine and generator, said switch being operable the other way upon movement of the arm toward maximum position to cut out the resistors, a governor acting in response to the engine speed and having sequentially operable speed response varying means operable in combination with the excitation resistor switches, said engine fuel varying means being controlled by the governor and said rheostat being controlled by the governor and governor speed response varying means to cause a rapid increase in the engine and generator speed and output from low to higher available values in response to the combined action of the fuel varying means, the rheostat and the resistors and resistor switches shunted across the rheostat.

3. A generating electric power plant and control system comprising an engine having fuel varying means to vary the engine torque, speed and output, an electric generator driven by the engine and having excitation and output varying means to cause operation of the engine at available values of load, said excitation and output varying means including a rheostat having an arm movable between minimum and maximum values of excitation and output positions, excitation resistors, sequentially operable resistor switching means in series with the resistors, and a toggle switch operable to one position by movement of the arm to the minimum position to connect the resistors and resistor switching means across the rheostat and operable to the other position by movement of the arm toward the maximum position to cut out the resistors, rheostat overriding control means operable to one position for holding the arm to the minimum position, a governor acting in response to the speed of the engine and generator power plant having manually controlled sequentially operable speed response setting means operable in combination with the resistor switching means, the governor and governor speed response setting means controlling operation of the rheostat and the engine fuel varying means controlling the engine fuel varying means and a manually operable controller controlling the governor speed setting and resistor switching means and movable from low to high speed, load and output controlling positions to control the overriding means and to cause movement of the rheostat overriding means to another position in order to cause a rapid increase in the speed, load and output of the engine and generator by the combined action of the rheostat arm and resistors while connected across the rheostat.

4. A generating electric power plant and control system comprising an engine having fuel varying means, an electric generator driven by the engine and having shunt and separate excitation means, each including switching means, the separate excitation means also including a rheostat having an arm movable between low and high excitation and output controlling positions, excitation resistors and sequentially operable resistor switching means in series therewith and a toggle switch operable to one position by movement of the rheostat arm to the low controlling position to connect the resistors and resistor switching means across the rheostat and to control the resistor switching means in the separately excited circuit to cause a rapid increase in the excitation and output of the generator corresponding to available speed and output values of the engine, rheostat overriding means holding the rheostat arm in the low position and movable to release the arm for movement toward the high position to operate the toggle switch to the other position to disconnect the resistors and successively control the switching means in the separately and shunt excited field to cause cutoff of the separate excitation means and render both excitation means operative, the rheostat overriding means being operable upon cutoff of the separate excitation means to cause movement of the rheostat arm to the low position to prevent a surge in the generator excitation and output upon excitation of both excitation means, a governor acting in response to the speed of the engine and generator having speed response setting means operable in combination with the excitation resistor switching means, said engine fuel varying means being controlled by the governor, said rheostat being controlled by the fuel varying means and the governor speed response setting means and interlocking and control connections including the speed response setting means, resistor switching means, toggle switch, shunt and separate excitation switching means and a manually operable master controller movable from low to high speed load and output controlling positions to cause a rapid rise in the excitation and output of the engine and generator by the combined action of the means included in these interlocking and control connections.

5. A locomotive generating electric traction and control system comprising locomotive traction motors, a traction generator, power connections interconnecting the motors and generator, an engine having fuel varying means and driving the generator, engine speed responsive means controlling the fuel varying means, said generator having excitation and output varying means including a rheostat having an arm movable between minimum and maximum excitation and output controlling positions and resistors and switching means for connecting the resistors across the rheostat upon movement of the rheostat arm from the minimum toward maximum controlling positions to provide a prompter increase in the engine and generator speed, load and output to the motors and preselected increasing values of tractive effort from the traction motors without overloading of the engine and generator and control means for the rheostat operable by upon an increase in the fuel supplied the engine in response to an increased speed of the engine in response to actuation of the speed response setting means to cause movement of the rheostat arm toward the maximum excitation and output position.

6. A locomotive generating electric traction and control system comprising locomotive traction motors, a traction generator, power connections interconnecting the motors and generator and including motor switching means for transferring the motor connections from a series-parallel to a parallel circuit relation with the generator, an engine having fuel varying means and driving the generator, engine speed responsive means controlling the fuel varying means, said generator having excitation and output varying means including a rheostat having an arm movable between minimum and maximum excitation and output controlling positions and resistors and switching means for connecting the resistors across the rheostat upon movement of the rheostat from the minimum toward maximum controlling positions to provide a prompter increase in the engine and generator speed, load and output to the motors and preselected increasing values of tractive effort from the traction motors without overloading of the engine and generator, control means for the rheostat operable by upon an increase in the fuel supplied the engine in response to an increased speed of the engine in response to actuation of the speed response setting means to cause movement of the rheostat arm toward the maximum excitation and output position and a motor connection transfer switch operable upon movement of the rheostat arm to the maximum excitation and output positions to cause transfer of the traction motor power connections from the series-parallel to the parallel relation.

7. A locomotive generating electric traction and control system comprising locomotive traction motors, a traction generator, power connections interconnecting the motors and generator, an engine driving the generator having fuel varying means, engine speed responsive means controlling the fuel varying means, speed response varying means for the speed responsive means to control the speed, torque and output of the engine, said generator having excitation and output varying means to vary the output of the generator in response to the available engine speed and output, said excitation varying means including a rheostat having an arm movable between minimum and maximum excitation and output controlling positions, rheostat control means operable in response to the fuel varying means and speed response setting means to cause movement of the arm to the maximum excitation and output position upon separately excited circuit to cause a rapid rise in the generator excitation and output of the generator to the motors to obtain preselected values of tractive effort of the traction motors, said toggle switch being moved to another position upon movement of the rheostat arm to a position intermediate the minimum and maximum controlling positions to disconnect the excitation resistors and to control discharge of the separately excited circuit by the control switch therein and to then control simultaneous excitation of both excitation circuits, a governor acting in response to the engine speed for controlling the engine fuel varying means, speed response setting means for the governor causing the engine to operate at constant values of idle speed and higher speed, torque and output proportional to the fuel supplied thereto, rheostat control means operable in response to the fuel supplied the engine and the speed setting of the governor to cause the rheostat to move toward an excitation and output position corresponding to the available output at a particular governor speed setting, said rheostat arm tending to move to the maximum excitation and output position when the engine is idling and rheostat overriding control means tending to hold the rheostat arm in the minimum excitation and output position to provide minimum motor starting tractive effort and to cause movement of this arm to this position upon discharge of the separately excited generator circuit and interlocking and an increase in the engine speed and output, rheostat overriding control means operative at minimum engine speed and output to move the rheostat arm to the minimum excitation and output control position, excitation resistors and switching means operable upon an increase in the speed, load and output of the engine and generator when the rheostat arm moves toward the maximum excitation and output position to connect the resistors across the rheostat to provide an increased speed, load and output of the engine and generator to the traction motors and preselected values of starting tractive effort of the motors.

8. A locomotive generating electric traction and control system comprising locomotive traction motors, a traction generator, power connections interconnecting the motors and generator, said generator having shunt and separately excited excitation circuits, each including control switches for closing and discharging these circuits, said separately excited circuit also including a field rheostat having an arm movable between minimum and maximum excitation and output controlling positions corresponding to the available engine speed and output, excitation resistors and sequentially operable resistor switches, and a toggle switch operable upon movement of the rheostat arm from the minimum toward the maximum position to connect the resistors and resistor switches across the rheostat and to control the control switch in the control connections including the governor speed response setting means, resistor switching means, toggle switch, excitation circuit control switches and rheostat overriding control means and a manually operable master controller movable between engine stop, idle and higher speed, load and output controlling positions for combined engine and generator power plant control means.

9. A locomotive generating electric traction and control system comprising an engine having fuel varying means, a traction generator driven by the engine and having an excitation system comprising two excitation circuits, each having a contactor to close and open these circuits, locomotive traction motors, power connections including series and parallel contactors for connecting groups of motors in series across the generator and in parallel therewith, an isochronous governor acting in response to the engine speed for controlling the fuel varying means, said governor having speed response setting means to cause operation of the engine at idle speed and minimum output and at higher values of speed and output, one of said generator excitation circuits also including a rheostat having an arm movable between minimum and maximum excitation and output controlling positions, rheostat control means operable by the governor and the governor speed response setting means to cause operation of the generator at higher constant values of speed, load and output corresponding to the governor speed response setting means, resistors and resistor switching means operable in combination with the governor speed response setting means, a toggle switch operable to one position by movement of the rheostat arm to the minimum excitation and output position to connect the resistors and switching means across the rheostat upon movement of the arm toward the maximum excitation and output position and to control excitation of the generator excitation circuit including the rheostat in order to cause a prompt rise in the engine and generator output to the traction motors, said toggle switch being movable to the other position upon movement of the rheostat arm to a position intermediate the minimum and maximum position in order to disconnect the resistors and resistor switches and control the contactor in the rheostat circuit to open this circuit and to then control both the contactors in both excitation circuits to close these circuits, a motor connection transfer switch operable by movement of the rheostat arm to the maximum speed, load and output connected to the excitation circuit contactor and motor contactors to control these contactors and cause transfer of the motor connection from series to parallel relation with the generator and opening of both generator excitation circuits during transfer of these motor connections.

10. In a locomotive generating electric traction and control system comprising an engine having fuel varying means, a traction generator driven by the engine and having an excitation system including separate and shunt excited excitation circuits, each including a contactor and discharge resistor for exciting and discharging these circuits, power connections including a current responsive backward transition relay and series and parallel contactors for connecting groups of traction motors in series across or directly across the generator in series-parallel or parallel power circuit with the generator, an isochronous governor acting in response to the engine speed for controlling the fuel varying means, said governor having speed response setting means to cause operation of the engine at idle speed and minimum output and at higher values of speed and output, said shunt excited excitation circuit also including a rheostat having an arm movable between minimum and maximum excitation and output controlling positions, rheostat control means controlled by the governor and governor speed response setting means to cause the engine and generator to operate at constant values of speed, load and output corresponding to the governor speed response setting means, rheostat winding control means operable upon discharge of the separately excited circuit by the contactor therein for moving the rheostat arm to the minimum controlling position, excitation resistors and resistor switching means operable in combination with the governor speed response setting means, a toggle switch operable to one position by movement of the rheostat arm to the minimum controlling position to connect the resistor and switching means across the rheostat upon movement of the arm toward the maximum position and to control excitation of generator separately excited circuit in order to cause a prompt rise in engine and generator output, said toggle switch being movable to another position upon movement of the rheostat arm to an intermediate controlling position between the minimum and maximum positions to disconnect the resistor and resistor switching means and control the contactors in the generator excitation circuits to cause discharge of the separately excited circuit and excitation of both excitation circuits when the rheostat arm is moved toward the minimum position by the overriding control means in response of discharge of the separate excitation circuit by the contactor therein, a forward transition control switch operable upon movement of the rheostat arm to the maximum position for controlling transfer of the motor connections from the series-parallel to the parallel connection, said current responsive backward transition relay controlling transfer of the motor connections from the parallel to the series-parallel connection and interlocking and control connections including the governor speed response setting means, excitation circuit and motor power circuit contactors, forward transition switch, backward transition relay, toggle switch and governor overriding means and also time delay means and a manual controller operable to establish the series-parallel connection, excitation of the separately excited circuit, the interlocking connections and time delay being arranged to cause movement of the rheostat arm toward the minimum position and discharge of both excitation circuits during transition of the motor connections.

RICHARD M. DILWORTH.

REFERENCES CITED

The following references are of record in the file of this patent:

UNITED STATES PATENTS

| Number | Name | Date |
| --- | --- | --- |
| 1,949,216 | McNairy | Feb. 27, 1934 |
| 2,266,326 | Lillquist | Dec. 16, 1941 |
| 2,292,203 | Cowin | Aug. 4, 1942 |
| 2,314,588 | Lillquist | Mar. 23, 1943 |
| 2,317,258 | Dilworth | Apr. 20, 1943 |
| 2,337,717 | Hines | Dec. 28, 1943 |
| 2,388,782 | Dilworth et al. | Nov. 13, 1945 |
| 2,449,399 | Lillquist | Sept. 14, 1948 |

Certificate of Correction

Patent No. 2,523,753 September 26, 1950

RICHARD M. DILWORTH

It is hereby certified that error appears in the printed specification of the above numbered patent requiring correction as follows:

Column 2, line 52, for "opopsite" read *opposite*; column 7, line 34, strike out the word "with", first occurrence; column 19, line 41, beginning with the word "separately" strike out all to and including "and" in line 72, same column, and insert the same before "control", second occurrence, in column 20, line 28;

and that the said Letters Patent should be read as corrected above, so that the same may conform to the record of the case in the Patent Office.

Signed and sealed this 20th day of March, A. D. 1951.

[SEAL]

THOMAS F. MURPHY,
*Assistant Commissioner of Patents.*